Patented Jan. 22, 1935

1,988,752

UNITED STATES PATENT OFFICE 1,988,752

COPPER FUNGICIDE

Alwyn C. Sessions, New Brunswick, N. J., assignor to Stanco Incorporated

No Drawing. Application October 3, 1931, Serial No. 566,785

8 Claims. (Cl. 167—16)

This invention relates to a new fungicide and more specifically to a fungicide comprising a complex copper ammonium silicate compound. The word "compound" is used throughout the specification and claims in a broad sense to mean either a definite chemical compound or a mixture of definite chemical compounds or any other complex association of the several chemical groups concerned. The invention also includes the method of preparing the fungicide and will be fully understood from the following description.

Copper has long been employed as a fungicide and while its toxicity is attributed wholly to the copper in solution, it must be applied to plants in an insoluble form. Through the action of the plant, the fungus, or atmospheric agencies, a sufficient amount of copper is brought into solution to destroy the fungous spore. If the copper compound is too unavailable its fungicidal efficiency may be too low to control the disease; if too available, it will be toxic toward the plant on which it is used. Since copper salts are readily soluble in slightly acid solutions and very insoluble under alkaline conditions, it is highly probable that the hydrogen-ion concentration (pH) of the protoplasm of the plant and spore as well as the acidity of the atmospheric moisture, plays an important role in the availability of the copper compound employed. Since we have no means of adjusting these external factors influencing the availability of the copper, I have prepared a copper salt in which the availability of the copper may be adjusted and which contains sufficient buffering power to be relatively unaffected by slight pH changes in the surrounding media. In other words a compound has been prepared in which the availability of the copper can be adjusted so as to be harmless to the plants on which it is applied, yet sufficiently available to destroy the disease in question.

I discovered that by adding to a sodium silicate solution ammonium hydroxide and a copper salt, preferably copper sulfate, insoluble copper ammonium silicate gels can be prepared which have a high degree of stability. The pH value of the mixture greatly alters the nature of the gel and the concentration of copper therein. It was found that with careful adjustment of the proportions of the chemicals involved, so that the resulting mixture is neither too acid nor too alkaline, practically all of the copper could be brought into an insoluble form. The relative availability of the copper can be adjusted by varying the proportions of ammonium hydroxide and sodium silicate employed. By experimentation I arrived at the following conclusions which are important for the right selection of the relative amounts of constituents:

1. When the pH of the mixture is neutral a decrease of the pH value increases the amount of soluble copper.

2. As the pH of the mixture is increased above 7.5 by the addition of more ammonium hydroxide there is a corresponding increase in the amount of soluble copper.

3. As the relative proportion of ammonia to the sodium silicate is increased in the mixture the pH range at which the copper can be held in an insoluble form becomes narrower.

4. As the relative proportion of sodium silicate to ammonia is increased in the mixture the pH range at which the copper can be held in an insoluble form becomes wider.

5. When a relatively high proportion of ammonium hydroxide is employed in making the copper ammonium silicate complex, the buffering action of the complex is lowered and a relatively small amount of acid will bring a relatively large quantity of copper into solution.

6. When a relatively high proportion of sodium silicate is used in the preparation of this copper complex, the buffering action is high and a relatively large amount of acid is required to bring copper into solution.

7. As the relative proportion of ammonium hydroxide used increases, the per cent of copper in the complex increases.

8. As the relative proportion of sodium silicate employed is increased, the per cent of copper in the complex is decreased.

It is evident from the above discussion that in this copper ammonium silicate complex we have a compound carrying insoluble copper, in which the buffering action and the availability of copper may be adjusted so as to be harmless to the plant and yet sufficiently toxic to destroy the disease.

The preparation of this new copper complex will be best illustrated by the following example: 50 pounds of copper sulfate is dissolved in 50 gallons of water; 55 pounds of sodium silicate (water glass) is diluted with water to twenty gallons. Into this diluted sodium silicate solution is stirred 17.5 pounds of an ammonia water (sp. gr. 0.9) which had previously been diluted with water to approximately 20 gallons. While the 50 gallons of copper sulfate solution are being rapidly stirred the 40 gallons of the sodium ammonium silicate solution are slowly added. An insoluble copper ammonium silicate gel forms, which is robin egg blue in color. The mixture is filtered through lawn cloth, the precipitate washed free of excess soluble salts and stored in barrels or drums to later be diluted and used as a spray.

As stated above, the ratio of ammonium hydroxide to sodium silicate may be altered but it is essential that the pH value of the final concentrated mixture obtained from copper sulfate, ammonium hydroxide and copper silicate, is not greater than 8.0 or lower than 6.5. If the mixture is made more basic than this by increasing the ammonium hydroxide, or more acid by decreasing the ratio of the alkalies to the copper sulfate much of the copper will remain in solution. Samples from the mixture are taken from time to time—as the sodium ammonium silicate is added—filtered and the pH value of the filtrate determined. When a neutral or slightly alkaline reaction is reached, the mixing is stopped, the mixture filtered and the precipitate washed.

The insoluble copper ammonium silicate compound can also be prepared by adding ammonium hydroxide to a solution of copper sulfate until the resulting mixture reaches a pH value of approximately 6.5 and then adding sufficient sodium silicate to bring the mixture to neutrality or to make it slightly alkaline, being careful that the pH value does not go above 8.

Another method of preparing my complex compound is to add sodium silicate to a solution of copper sulfate until the pH value of the mixture approaches 6.8 and then add the ammonium hydroxide until the mixture is neutral or slightly alkaline, being careful not to exceed a pH value of 8. An insoluble copper silicate can be prepared by adding sufficient sodium silicate to the copper sulfate to bring the mixture to a pH of 7.0–7.5. But the copper concentration of such a paste is low.

In the modified processes, like in the above example, the final mixture is filtered and the precipitate washed with water until free of excess salts.

Instead of copper sulfate other soluble copper salts, such as copper chloride, etc., may also be used in the preparation of the complex copper compound. The copper ammonium silicate pastes formed by these methods differ somewhat in the percentage of the various components and as a consequence also in their buffering action towards acids and bases. The mixture is filtered and the paste washed free of soluble salts. When the fungicide is applied to plants it is diluted with water to the desired strength.

My complex copper compound may also be used as fungicide in powder form. For this purpose the precipitate obtained by any of the above described methods is dried, ground and sieved or air floated. An inert filling material such as talc or powdered clay may be added to the complex copper compound.

The complex copper ammonium silicate compound prepared by any of the various modifications of my process has proven in field and laboratory tests to be an excellent fungicide when incorporated with water and used as a spray or when used as dust on agricultural plants.

When properly prepared as described above the spray or dust has proven substantially harmless to plants on which it was used. Field and laboratory studies have shown this new complex to be no more harmful towards apples, peaches, sunflowers, tomatoes, potatoes or bean foliage than Bordeaux mixture at the same copper concentration. Laboratory tests and field experiments have also shown this compound to be highly effective as a fungicide against fungi such as Ventura inaequalis, Cylindros orium pomi Brooks, Pestalotia macrotricha. Its fungicidal value and the availability of the copper can be regulated according to the plant and fungus, during its manufacture, according to the principles above enumerated. When used for spraying the final spray preferably contains from 0.03% to 0.40% of copper. When used as dust it may be used either in concentrated form or mixed with say 4 times its weight of a filler.

The powder or dust form of this fungicide has proven highly effective as a seed disinfectant. In tests where its efficiency was compared with some fifteen different commercial materials, it ranked second to the highest in controlling the fungi responsible for the seed decay of peas.

Studies of the efficiency of this material as a control for apple scab have been carried out in different orchards involving over a thousand trees. In these experiments comparisons were made between the efficiency of the copper ammonium silicate and the standard spray schedule as recommended by the Experiment Station of New Jersey for the control of apple scab. Leaf counts made June 26, 1931 of the infected and non-infected leaves together with the spray schedules are as follows:

| Spray No. | Spray program and material used | | | | Seven-day and subsequent sprays | Percent leaves with scab | Percent leaves clean from scab |
|---|---|---|---|---|---|---|---|
| | Delayed dormant | Pre-pink | Pink | Petal fall | | | |
| 1 | Oil 3% Cresylic acid 0.5% | Lime sulfur 1—40 | Lime sulfur 1—40 | Flotation sulfur 10 lbs. — 100 gals. Lead arsenate 3 lbs.—100 gals. | Flotation sulfur 10 lbs. to 100 gals. Lead arsenate 3 lbs.—100 gals. | 2.4 | 97.6 |
| 2 | None | Oil 3% Copper ammonium silicate 0.25% Cu. | Copper ammonium silicate 0.25% Cu. | Copper ammonium silicate 0.12% Cu. Lead arsenate 3 lbs. to 100 gals. | Copper ammonium silicate 0.06% Cu. Lead arsenate 3 lbs. to 100 gals. | 0.4 | 99.6 |
| 3 | Check. No spray applied | | | | | 47 | 53 |

*Paste form of the spray was employed.

Experiments were conducted to determine the efficiency of the copper ammonium silicate as a seed treatment for controlling the fungi responsible for seed decay and the damping-off of cucumbers. The seeds were treated by shaking them with the powdered form of the fungicide and screening off the dust that would not adhere to the seed.

While but 3.6 per cent of the plants from the untreated seed survived, the attack of these organisms, 54 per cent of the copper ammonium silicate treated seed germinated and produced plants. In comparative tests with 14 other recognized seed disinfectants, the copper ammonium silicate ranked fourth to the highest in efficiency against these fungi.

In other experiments pea seeds were treated, before they were planted, with the powdered form of the copper ammonium silicate and fourteen other recognized seed disinfectants to determine the comparative efficiency of these materials in controlling the fungi responsible for seed decay of peas. Only seven per cent of the untreated seed lived, while 43 per cent of the seeds treated with copper ammonium silicate germinated and produced plants.

Of the 14 other materials tested only one gave better control than did the copper ammonium silicate and this was an organic mercury compound. Sixty-one per cent of the seeds treated with this material survived. With the third best material employed there were only 25 per cent of the seeds planted which did not decay.

This invention is not to be limited by any theory or the particulars given by way of illustration but only by the following claims in which it is my intention to claim all novelty inherent in the process.

I claim:

1. The method of preparing a complex fungicidal copper compound which comprises admixing a copper salt, sodium silicate and ammonia in aqueous solutions in such proportions as to adjust the availability of the copper in the complex so that the latter becomes harmless to the plant being sprayed yet toxic to the organism producing the disease in question.

2. The method of preparing a complex fungicidal copper compound which comprises adding ammonia to an aqueous solution of sodium silicate and mixing so much of the solution thus obtained with an auqeous solution of copper sulfate that the pH value of the mixture be substantially between the approximate limits of 6.5 and 8.

3. The method of preparing a complex fungicidal copper compound which comprises admixing ammonia to a solution of copper sulfate until the resulting mixture reaches a pH value of approximately 6.8 and then admixing sufficient sodium silicate to bring the mixture to neutrality or make it slightly alkaline without exceeding a pH value of about 8.

4. The method of preparing a complex fungicidal copper compound which comprises admixing sodium silicate to a solution of copper sulfate until the pH value of the mixture approaches 6.8 and then adding ammonia until the mixture is neutral or slightly alkaline without exceeding a pH value of about 8.

5. The process according to claim 1 in which the mixture is filtered and washed with water until the free of inorganic salts.

6. The method of destroying fungi which comprises spraying on the plant diseased with fungi a fungicide obtained by admixing a copper salt, sodium silicate, and ammonium hydroxide in aqueous solutions and in such proportions as to render the copper sufficiently available to destroy the fungus but harmless to the plant.

7. The method of destroying fungi which comprises dusting on the plant a fungicidal dust obtained by admixing a copper salt, sodium silicate, and ammonium hydroxide in aqueous solutions, filtering the mixture, washing the precipitate with water until substantially free of soluble salts, drying and powering the residue.

8. A fungicide, comprising a complex copper ammonium silicate compound.

A. C. SESSIONS.